United States Patent
Horiuchi et al.

(10) Patent No.: US 10,678,404 B2
(45) Date of Patent: Jun. 9, 2020

(54) OPERATION OF A DATA PROCESSING SYSTEM DURING GRAPHICAL USER INTERFACE TRANSITIONS

(71) Applicant: International Business Machines Corporation, Armonk, NY (US)

(72) Inventors: Yoshio Horiuchi, Hiratsuka (JP); Tsend Ochir Bat Ulzii, Edogawa-ku (JP); Tomoko Murayama, Yokohama (JP); Masaki Saitoh, Yokohama (JP); Masayuki Yamana, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 251 days.

(21) Appl. No.: 15/844,378

(22) Filed: Dec. 15, 2017

(65) Prior Publication Data
US 2019/0187868 A1 Jun. 20, 2019

(51) Int. Cl.
*G06F 3/0484* (2013.01)
*G06F 3/0482* (2013.01)
*G06F 9/451* (2018.01)
*G06F 3/0481* (2013.01)

(52) U.S. Cl.
CPC .......... *G06F 3/0484* (2013.01); *G06F 3/0482* (2013.01); *G06F 9/451* (2018.02); *G06F 3/04817* (2013.01)

(58) Field of Classification Search
CPC .. G06F 3/0484; G06F 3/0482; G06F 3/04817; G06F 9/451
See application file for complete search history.

(56) References Cited

U.S. PATENT DOCUMENTS

| | | | |
|---|---|---|---|
| 6,323,884 B1 | 11/2001 | Bird et al. | |
| 8,543,942 B1* | 9/2013 | Kumar | G06F 3/04842 715/711 |
| 8,839,145 B2 | 9/2014 | Shores et al. | |
| 8,863,024 B2 | 10/2014 | McCormick et al. | |
| 9,182,889 B1* | 11/2015 | Karlo | G06F 3/04817 |

(Continued)

OTHER PUBLICATIONS

Feske, N. "Securing graphical user interfaces," Doctoral dissertation, Dresden University of Technology, retrieved from the Internet: < http://www.genode-labs.com/publications/secure-gui-2009.pdf>, Feb. 2009, 85 pg.

*Primary Examiner* — Amy M Levy
(74) *Attorney, Agent, or Firm* — Cuenot, Forsythe & Kim, LLC

(57) ABSTRACT

A first user input event initiating a transition of a GUI from a first state to a second state is generated in response to detecting a first user input received by the GUI. A first spatial location in the GUI selected by the first user input can be identified. A second user input event is generated in response to detecting a second user input received by the GUI while the GUI is in the second state. A second spatial location in the GUI selected by the second user input can be identified. A level of discontinuity between the first user input and the second user input can be determined. If the level of discontinuity does not exceed a threshold value, at least one user input event handling process can be selected to process the second user input event based on the level of discontinuity not exceeding the discontinuity threshold value.

9 Claims, 8 Drawing Sheets

(56) References Cited

U.S. PATENT DOCUMENTS

| | | |
|---|---|---|
| 9,405,558 B2 | 8/2016 | Butin et al. |
| 2002/0050978 A1 | 5/2002 | Rosenberg et al. |
| 2011/0202855 A1* | 8/2011 | Ikegami ............. G06F 11/3688 |
| | | 715/762 |
| 2011/0307833 A1* | 12/2011 | Dale .................. G06F 3/04886 |
| | | 715/835 |
| 2014/0062893 A1* | 3/2014 | Kawalkar ............ G06F 3/0488 |
| | | 345/173 |
| 2014/0325530 A1* | 10/2014 | Lu .......................... G06F 9/542 |
| | | 719/318 |
| 2015/0301683 A1* | 10/2015 | Yuan ................. H04M 1/72522 |
| | | 345/178 |
| 2017/0153794 A1* | 6/2017 | Horiuchi ............ G06F 3/04812 |
| 2017/0192649 A1* | 7/2017 | Bakken .............. G06F 3/04842 |
| 2018/0024723 A1* | 1/2018 | Vecera ................ G06F 3/0484 |
| | | 715/808 |
| 2018/0173405 A1* | 6/2018 | Pereira ............... G06F 3/04842 |

* cited by examiner

OPERATION OF A DATA PROCESSING SYSTEM DURING GRAPHICAL USER INTERFACE TRANSITIONS

BACKGROUND

The present invention relates to data processing systems, and more specifically, to graphical user interfaces.

A graphical user interface (GUI) is a type of user interface presented on a display that presents visually rendered GUI elements, at least some of which are controls such as icons, buttons, etc. Users may interact with electronic devices/systems by manipulating the controls, for example using a pointing device such as a mouse, touchpad, touchscreen, etc. In illustration, users can select controls to launch applications, navigate menus, navigate different GUI views presented by the GUI or applications, and so on. GUIs originally were introduced in reaction to the perceived steep learning curve for learning how to operate command-line interfaces (CLIs), which require commands to be typed on a keyboard. In comparison to the user of CLIs, the use of GUIs generally is perceived to be more intuitive to users, especially users who are novices to using computing devices/systems.

SUMMARY

A method includes generating a first user input event initiating a transition of a graphical user interface (GUI) from a first state to a second state in response to detecting a first user input received by the GUI. The method also can include identifying, in real time, a first spatial location in the GUI selected by the first user input. The method also can include generating a second user input event in response to detecting a second user input received by the GUI while the GUI is in the second state. The method also can include identifying, in real time, a second spatial location in the GUI selected by the second user input. The method also can include determining, in real time, a level of discontinuity between the first user input and the second user input, and determining whether the level of discontinuity between the first user input and the second user input exceeds a discontinuity threshold value. The method also can include, responsive to determining that the level of discontinuity between the first user input and the second user input does not exceed the discontinuity threshold value, selecting, using a processor, in real time, at least one user input event handling process based on the level of discontinuity not exceeding the discontinuity threshold value, and processing the second user input event, in real time, using the selected at least one user input event handling process.

A system includes a processor programmed to initiate executable operations. The executable operations include generating a first user input event initiating a transition of a graphical user interface (GUI) from a first state to a second state in response to detecting a first user input received by the GUI. The executable operations also can include identifying, in real time, a first spatial location in the GUI selected by the first user input. The executable operations also can include generating a second user input event in response to detecting a second user input received by the GUI while the GUI is in the second state. The executable operations also can include identifying, in real time, a second spatial location in the GUI selected by the second user input. The executable operations also can include determining, in real time, a level of discontinuity between the first user input and the second user input, and determining whether the level of discontinuity between the first user input and the second user input exceeds a discontinuity threshold value. The executable operations also can include, responsive to determining that the level of discontinuity between the first user input and the second user input does not exceed the discontinuity threshold value, selecting, in real time, at least one user input event handling process based on the level of discontinuity not exceeding the discontinuity threshold value, and processing the second user input event, in real time, using the selected at least one user input event handling process.

A computer program product includes a computer readable storage medium having program code stored thereon. The program code is executable by a data processing system to initiate operations. The operations include generating a first user input event initiating a transition of a graphical user interface (GUI) from a first state to a second state in response to detecting a first user input received by the GUI. The operations also can include identifying, in real time, a first spatial location in the GUI selected by the first user input. The operations also can include generating a second user input event in response to detecting a second user input received by the GUI while the GUI is in the second state. The operations also can include identifying, in real time, a second spatial location in the GUI selected by the second user input. The operations also can include determining, in real time, a level of discontinuity between the first user input and the second user input, and determining whether the level of discontinuity between the first user input and the second user input exceeds a discontinuity threshold value. The operations also can include, responsive to determining that the level of discontinuity between the first user input and the second user input does not exceed the discontinuity threshold value, selecting, in real time, at least one user input event handling process based on the level of discontinuity not exceeding the discontinuity threshold value, and processing the second user input event, in real time, using the selected at least one user input event handling process.

DETAILED DESCRIPTION

Figure 1:
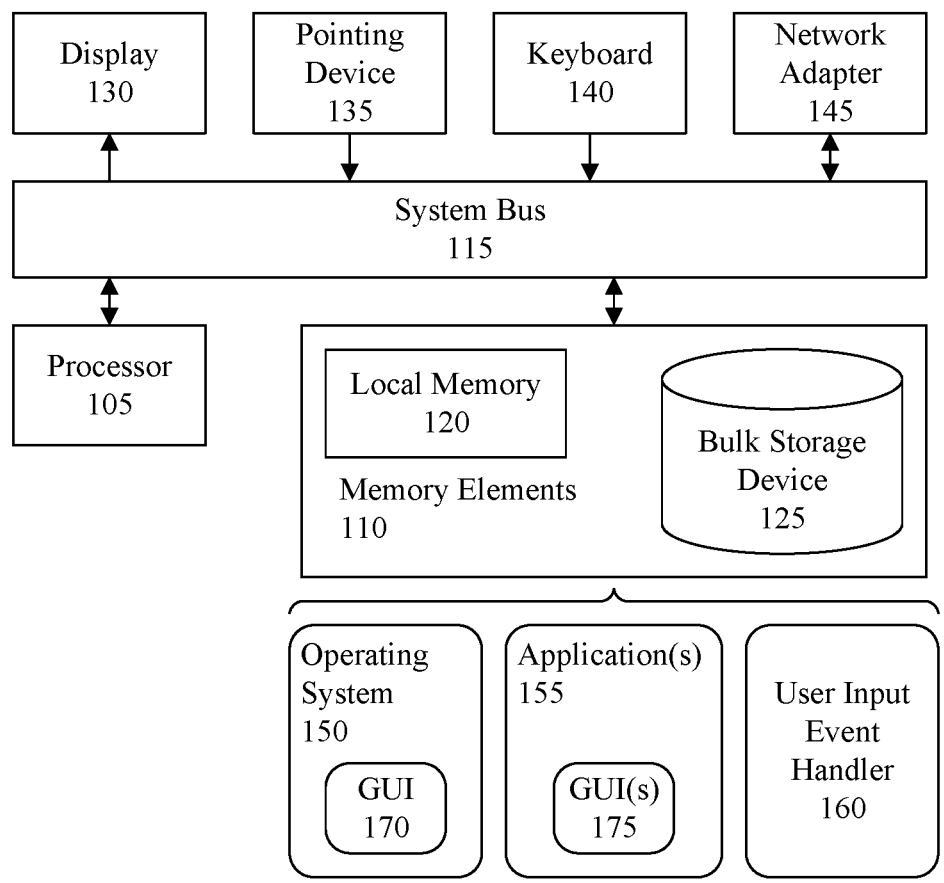
FIG. 1 is a block diagram illustrating example architecture for a processing system.

This disclosure relates to data processing systems, and more specifically, to graphical user interfaces. It is not uncommon for a user to sequentially select controls in a graphical user interface (GUI) to navigate through various GUI elements (e.g., windows, menus, etc.). Successive selections (e.g., mouse clicks, finger touches, etc.) often are disrupted due to position of the controls within the GUI being changed as the GUI transitions between states presenting the different GUI elements. For example, in a first state, a navigation control being selected may be at a first location, but after the GUI changes to another state in response to that navigation control being selected, the navigation control may be in a different location. In some cases, a completely different control may at the first location. If the user is rapidly entering user inputs, expecting to keep selecting the same control, the user may unexpectedly select a control the user did not intend to select, or may otherwise enter a user input that does not achieve the user's intended result. The arrangements described herein address such issues by improving the way in which the data processing system interprets successive user inputs during GUI transitions. Such improvements to the data processing system can greatly improve the user's experience using the data processing system.

Several definitions that apply throughout this document now will be presented.

As defined herein, the term "user input event" means an event in which a user enters a user input into a data processing system.

As defined herein, the term "graphical user interface element" means an element visually presented by a graphical user interface.

As defined herein, the term "control," when used as a noun, means a graphical user interface element that, responsive to being selected by a user, initiates at least one process.

As defined herein, the term "state" means a particular condition a graphical user interface is in at a particular time. For example, in a first state a graphical user interface can present a first view, and in a second state the graphical user interface can present a second view.

As defined herein, the term "level of discontinuity" means a value indicating a level of a lack of continuity.

As defined herein, the term "discontinuity threshold value" means a threshold value to which a level of discontinuity is compared to determine whether the level of discontinuity exceeds that threshold value.

As defined herein, the term "level of association" means a value indicating how closely things (e.g., graphical user interface states and/or graphical user interface elements) are associated.

As defined herein, the term "association threshold value" means a threshold value to which a level of association is compared to determine whether the level of association exceeds that threshold value.

As defined herein, the term "contextual data" means data indicating circumstances relating to a thing (e.g., a graphical user interface or a graphical user interface element).

As defined herein, the term "spatial location" means a location defined by at least two spatial dimensions (e.g., x and y coordinates).

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating example architecture for a data processing system 100. The data processing system 100 can include at least one processor 105 (e.g., a central processing unit) coupled to memory elements 110 through a system bus 115 or other suitable circuitry. As such, the data processing system 100 can store program code within the memory elements 110. The processor 105 can execute the program code accessed from the memory elements 110 via the system bus 115. It should be appreciated that the data processing system 100 can be implemented in the form of any system including a processor and memory that is capable of performing the functions and/or operations described within this specification. For example, the data processing system 100 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 110 can include one or more physical memory devices such as, for example, local memory 120 and one or more bulk storage devices 125. Local memory 120 refers to random access memory (RAM) or other non-persistent memory device(s) generally used during actual execution of the program code. The bulk storage device(s) 125 can be implemented as a hard disk drive (HDD), solid state drive (SSD), or other persistent data storage device. The data processing system 100 also can include one or more cache memories (not shown) that provide temporary storage of at least some program code in order to reduce the number of times program code must be retrieved from the bulk storage device 125 during execution.

Input/output (I/O) devices such as a display 130 and, optionally a pointing device 135 and a keyboard 140 can be coupled to the data processing system 100. In one non-limiting arrangement, the display 130 can be a touchscreen configured to detect touches by an appendage (e.g., a finger) of a user as user input events. Touchscreens are well known in the art. The pointing device 135 can be a mouse, touchpad, or any other suitable device with which a user may interact to enter user inputs to the data processing system 100, which may be detected as user input events. In one aspect, the pointing device 135 can be a gesture sensor, for example an infrared sensor or capacitive sensor, that detects user gestures and generates corresponding user input events. The I/O devices can be coupled to the data processing system 100 either directly or through intervening I/O controllers. For example, the display 130 can be coupled to the data processing system 100 via a graphics processing unit (GPU), which may be a component of the processor 105 or a discrete device.

One or more network adapters 145 also can be coupled to data processing system 100 to enable the data processing system 100 to become coupled to other systems, computer systems, remote printers, and/or remote storage devices through intervening private or public networks. Modems, cable modems, transceivers, and Ethernet cards are examples of different types of network adapters 145 that can be used with the data processing system 100.

As pictured in FIG. 1, the memory elements 110 can store the components of the data processing system, namely an operating system 150, one or more applications 155 and a user input event handler 160. Being implemented in the form of executable program code, the operating system 150, application(s) 155 and user input event handler 160 can be executed by the data processing system 100 and, as such, can be considered part of the data processing system 100. The operating system 150 can include a graphical user interface GUI 170, and the application(s) 155 each can include a respective GUI 175. The user input event handler 160 can be a component of the operating system 150, a component of one or more of the applications 155, a plugin for one or more of the applications 155 that interfaces with the GUI(s) 175 and other components of the application(s) 155, or a stand-alone application hosted by the operating system 150 that interfaces with the GUI 170 and/or the GUI(s) 175 and other components of the operating system 150 and/or application(s) 155. The operating system 150, applications 155, GUI 170, GUI(s) 175 and user input event handler 160 are functional data structures that impart functionality when employed as part of the data processing system 100.

Data generated by the operating system 150, applications 155, GUI 170, GUI(s) 175 and user input event handler 160 can be output to, and stored within, the memory elements 110. As used herein, "outputting" and/or "output" can mean storing in the memory elements 110, for example, writing to a file stored in the memory elements 110, writing to the display 130 or other peripheral output device, playing audible notifications, sending or transmitting to another system, exporting, or similar operations.

Figure 2:
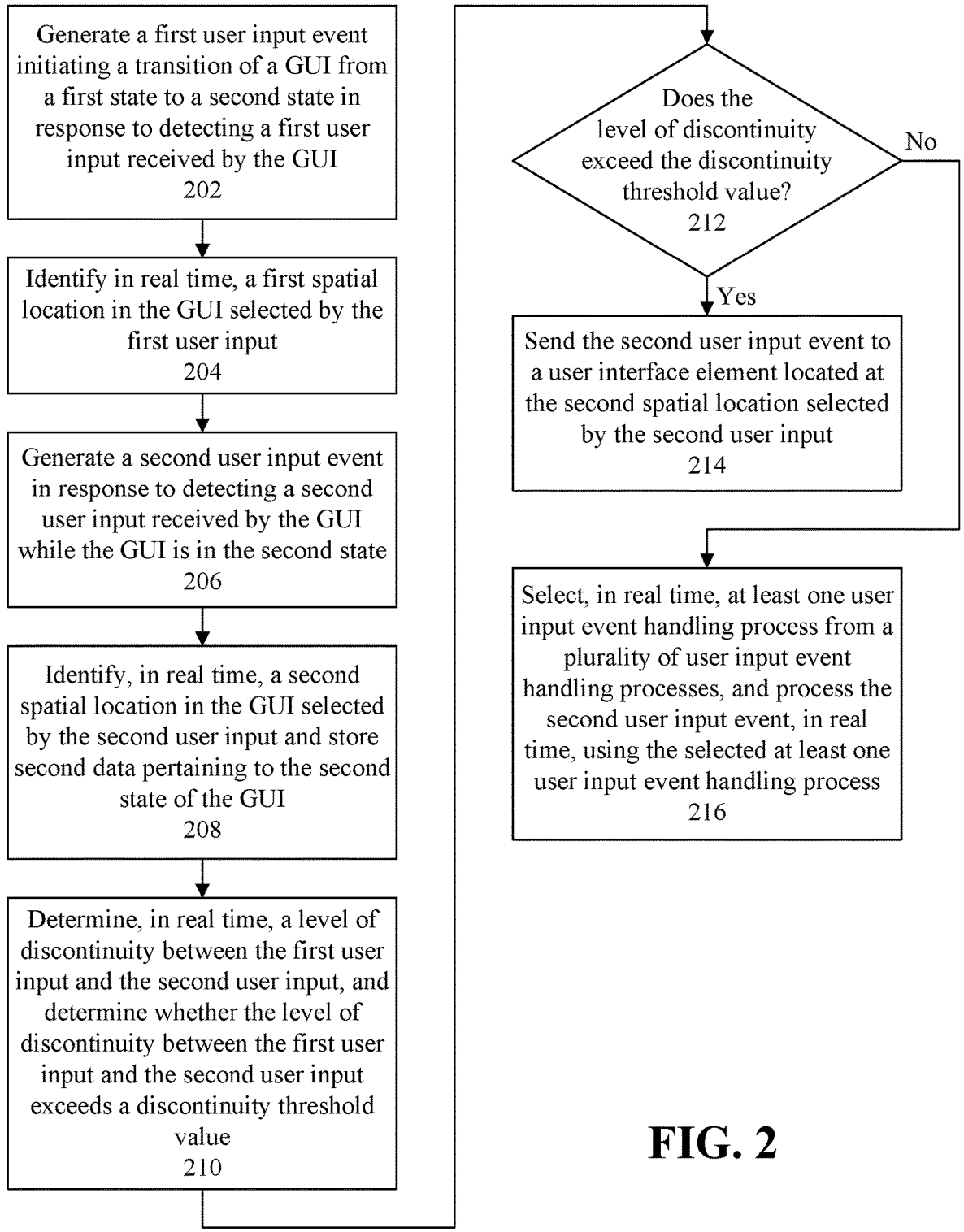
FIG. 2 is a flowchart illustrating an example of a method of processing user input events.

FIG. 2 is a flowchart illustrating an example of a method 200 of processing user input events. The method 200 can be implemented by the data processing system 100 of FIG. 1. For example, the user input event handler 160 can interface with the operating system 150 and/or application(s) 155 to implement the method 200.

Figure 3:
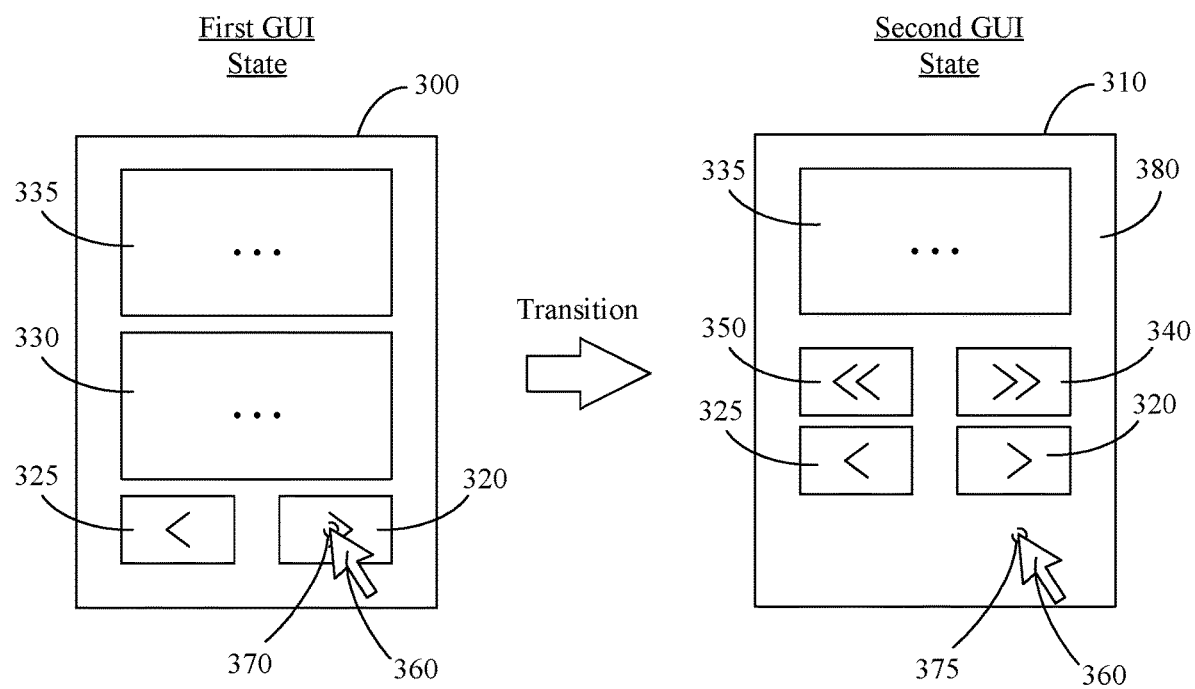
FIG. 3 is a pictorial diagram illustrating examples of views presented by a graphical user interface.

FIG. 3 is a pictorial diagram illustrating examples of views 300, 310 presented by a GUI, for example on the display 130 of FIG. 1. Each view 300, 310 can represent a respective state of the GUI. For example, in the first state the view 300 can present a plurality of GUI elements, for example a control 320, a control 325, and GUI elements 330, 335. In the second state, the view 310 can present at least some of the GUI elements 320-335 presented in the view 300, but need not present all of the GUI elements 320-335. Further, in the second state, the view may present one or more additional GUI elements. For instance, in the second state the GUI can present in the view 310 the GUI elements 320, 325, 335 and additional elements 340, 350 (e.g., controls), but need not present the GUI element 330.

Referring to FIG. 2, at step 202 of the method 200, the data processing system 100 (e.g., the user input event handler 160) can generate a first user input event initiating a transition of a GUI from a first state to a second state in response to detecting a first user input received by the GUI. For example, referring to FIG. 3, the user input event can initiate the GUI to transition from the view 300 to the view 310. In illustration, the data processing system 100 can detect a user selection of the control 320 presented in the view 300 by the GUI. The user can select the control 320 using a pointing device controlling a cursor 360 or, in an arrangement in which the display 130 is a touchscreen, by touching the display 130.

In response to detecting the first user input event, at step 204 the data processing system 100 can identify, in real time, a first spatial location 370 in the GUI selected by the first user input. The data processing system 100 also can store first data pertaining to the first state of the GUI. Such data can include, for example, an indication of the GUI elements 320-335 presented in the view 300 and respective spatial locations of the GUI elements 320-335 in the GUI. Further, in response to detecting the first user input event, the data processing system 100 can transition the GUI from the first state to the second state, thus transitioning from the view 300 to the view 310.

At step 206, the data processing system 100 can generate a second user input event in response to detecting a second user input received by the GUI while the GUI is in the second state, for example while the view 310 is presented on the display 130 by the GUI. At step 208, the data processing system 100 can identify, in real time, a second spatial location 375 in the GUI selected by the second user input. The second spatial location 375 can be the same as first spatial location 370, for example if the user did not move the cursor 360 between mouse clicks or touched the display at the same location, or can be different than the first spatial location 370 if the user did move the cursor 360 between mouse clicks or touch the display at different locations. The data processing system 100 also can store second data pertaining to the second state of the GUI.

At step 210, the data processing system 100 can determine, in real time, a level of discontinuity between the first user input and the second user input, and determine whether the level of discontinuity between the first user input and the second user input exceeds a discontinuity threshold value. In illustration, assume the first and second user inputs are mouse clicks. The data processing system 100 can determine a period of time between the mouse clicks, and assign a first value to the determined period of time. In illustration, if the period of time is 0.3 seconds, the first value can be 0.3. Further, the data processing system 100 can determine a spatial distance between the first spatial location 370 and the second spatial location 375, and assign a second value to the determined distance. For example, if the distance is 0.5 mm, the second value can be 0.5. Based on the first and second values, the data processing system 100 can determine the level of discontinuity between the first user input and the second user input. For example, the data processing system 100 can assign a weighting to the first value, assign a weighting to the second value, and sum the weighted first and second values to generate a weighted sum.

The data processing system 100 can determine the level of discontinuity to be the weighted sum, and determine whether the level of discontinuity exceeds the discontinuity threshold value.

Referring to decision box 212, if the level of discontinuity exceeds the discontinuity threshold value, at step 214 the data processing system 100 can send the second user input event to a user interface element located at the second spatial location 375 selected by the second user input. For example, referring to FIG. 3, the second user input can select empty space within a window 380 presented by the view 310, thus the second user input event can be sent to that window 380. Of course, if there is another user interface element (not shown) located at the second spatial location 375, such as another user interface control, the second user input event can be sent to that other user interface element. If, however, the level of discontinuity does not exceed the discontinuity threshold value, at step 216 the data processing system 100 can select, in real time, at least one user input event handling process from a plurality of user input event handling processes, and process the second user input event, in real time, using the selected at least one user input event handling process. Examples of user input event handling processes are discussed below.

Figure 4A:
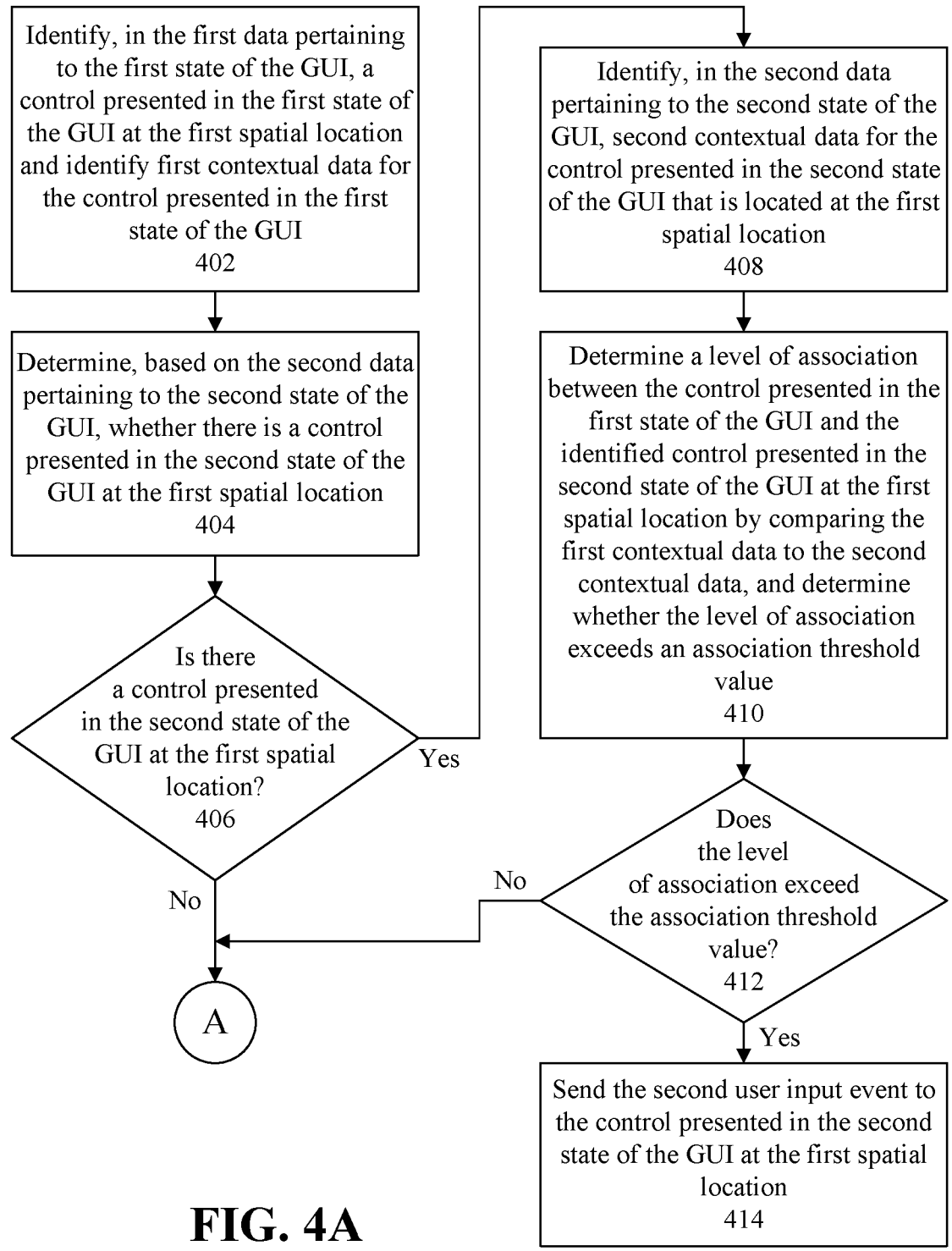
FIGS. 4A, 4B and 4C, together, are a flowchart illustrating an example of a further method of processing user input events.
Figure 4B:
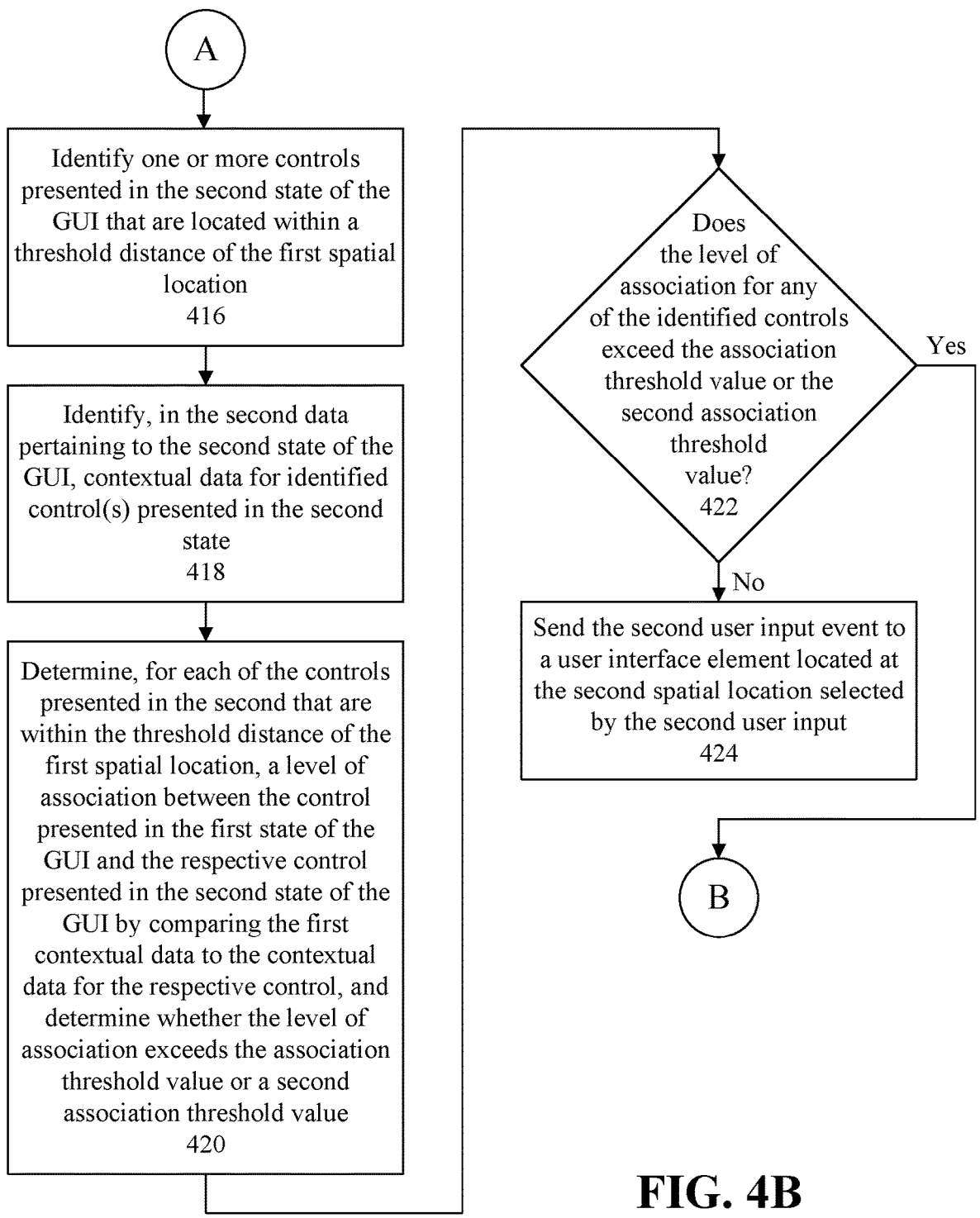
Figure 4C:
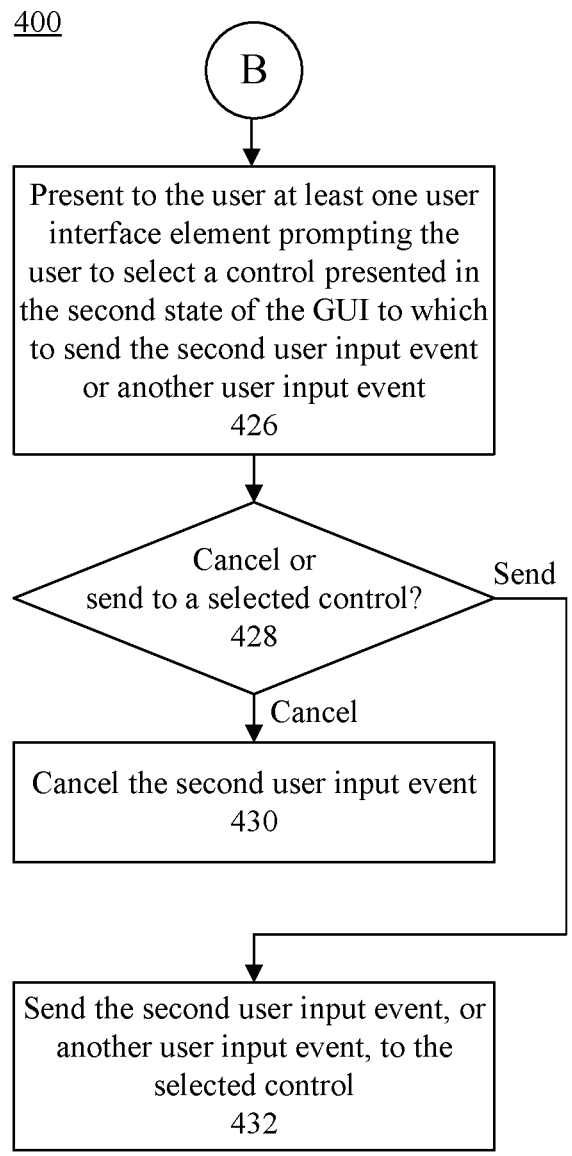

FIGS. 4A, 4B and 4C are a flowchart illustrating an example of a further method 400 of processing user input events. The method 400 is an example of a user input event handling process that can be selected at step 216 of FIG. 2. The method 400 can be implemented by the data processing system 100 of FIG. 1. For example, the user input event handler 160 can interface with the operating system 150 and/or application(s) 155 to implement the method 400.

Referring to FIG. 4A, at step 402 the data processing system 100 can identify, in the first data pertaining to the first state of the GUI, a control presented in the first state of the GUI at the first spatial location, and identify first contextual data for the control presented in the first state of the GUI at the first spatial location. For example, referring to FIG. 5, the data processing system 100 can identify the control 320 located at the first spatial location 370, and identify contextual information for that control 320. The contextual information can include, for example, text (e.g., alphanumeric text, symbols, etc.) and/or an image of, or resented by, the control 320 (e.g., an icon representing the control), and also may include text to which the control 320 is linked (e.g., text to which the control 320 serves as a link). Examples of text include, but are not limited to, a control identifier and natural language information such as a tool tip text, help text, etc.

At step 404, the data processing system 100 can determine, based on the second data pertaining to the second state of the GUI, whether there is a control presented in the second state of the GUI at the first spatial location. Referring to decision box 406, if there is a control presented in the second state of the GUI at the first spatial location, at step 408 the data processing system 100 can identify, in the second data pertaining to the second state of the GUI, second contextual data for the control presented in the second state of the GUI that is located at the first spatial location. For example, referring to FIG. 5, the data processing system 100 can identify the control 510 located at the first spatial location 370, and identify contextual information for that control 510. The contextual information can include, for example, text (e.g., alphanumeric text, symbols, etc.) and/or an image of, or presented by, the control 510 (e.g., an icon representing the control), and may include text to which the control 510 is linked (e.g., text to which the control 510 serves as a link).

At step 410, the data processing system 100 can determine a level of association between the control 320 presented in the first state of the GUI and the identified control 510 presented in the second state of the GUI at the first spatial location 370. The data processing system 100 can determine the level of association by comparing the first contextual data to the second contextual data. Further, the data processing system 100 can determine whether the level of association exceeds an association threshold value.

Figure 5:
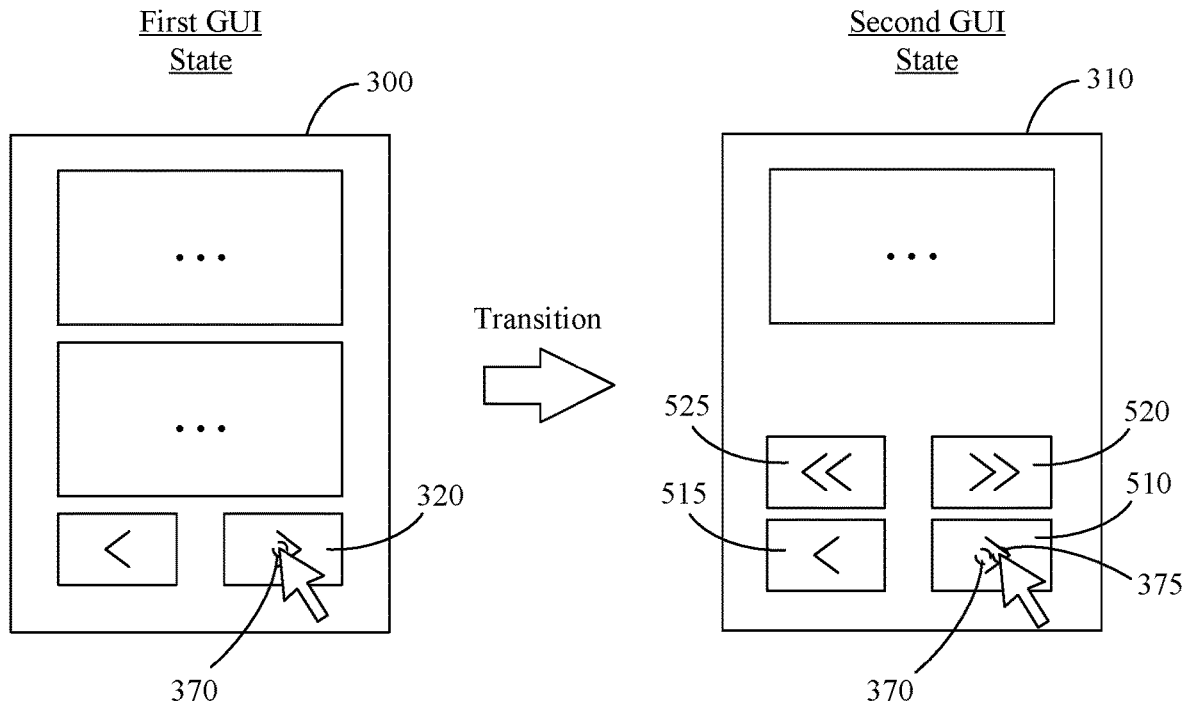
FIG. 5 is a pictorial diagram illustrating examples of views presented a graphical user interface.

In illustration, referring to FIG. 5, the data processing system 100 can determine a degree of similarity between the controls by comparing images of the respective controls (e.g., icons). For instance, the data processing system 100 can determine a degree of similarity in the images of the respective controls 320, 510. Further, the data processing system 100 can determine a degree of similarity in text presented by the respective controls 320, 510 and/or text to which the respective controls 320, 510 are linked. In this example, the controls 320, 510 have the same image (e.g., same shape, etc.), so the data processing system 100 can assign a high value to the degree of similarity in the images. Further, the respective controls 320, 510 each present the same text (">"), and thus the data processing system 100 can assign a high value to the degree of similarity of the text. Further, the data processing system 100 can apply a weighting factor to each of the degree of similarity values to normalize the values, and sum the weighted degree of similarity values to determine the level of association between the controls 320, 510. For example, the level of association can be determined by the following equation:

$$L_A = ax + by$$

where "$L_A$" is the level of association, "x" is a value representing the degree of similarity of the images, "a" is a weighting factor applied to "x," "y" is a value representing the degree of similarity of the text, and "b" is a weighting factor applied to "y."

The weighting factors can be predetermined values selected to normalize the level of association to a range from a particular minimum value, for example 0, to a particular maximum value, for example 1. In illustration, the values of "x" and "y" that are assigned can be between 0 and 1, and the weighting factors "a" and "b" can sum to 1 (e.g., x=0.6 and y=0.4). Thus, the level of association can be a value in a range from 0 to 1, where 1 indicates that the controls 320, 510 are the same control, but presented in different states of the GUI, and 0 indicates that there is a high confidence that the controls 320, 510 are not the same.

To determine the degree of similarity of text, the data processing system 100 can implement one or more functions. An example of such a function is an edit distance function, which is known in the art. Edit distance is a way of quantifying how dissimilar two strings of text are to one another by counting the minimum number of operations required to transform one string into the other. Another example of such a function is a function that identifies synonyms and equivalent terms, for example by comparing words, phrases, symbols, etc., using an electronic dictionary or thesaurus, which can be a component of the user input event handler 160, operating system 150 and/or application(s) 155. Results of the functions can be normalized to a value in a range from 0 to 1, where 1 indicates an exact match and 0 indicating no match. For instance, the number 1 can be divided by the number of operations counted by the edit distance function, and the result of that division can be normalized. Further, the results of the synonym identification can be assigned a value from 0 to 1 and that value can be normalized. Thus, the sum of the result of the edit distance function and the result of the synonym identification can be in a range from 0 to 1.

Referring to decision box 412 of FIG. 4A, if the level of association between the control presented in the first state of the GUI and the identified control presented in the second state of the GUI at the first spatial location exceeds the threshold value, at step 414 the data processing system 100 can send the second user input event to the control presented in the second state of the GUI at the first spatial location. In illustration, referring to FIG. 5, the data processing system 100 can send the event to the control 510 which may, but need not, be the same control as the control 320. The control 510 can process the event, for example to initiate transition of the GUI to another state (e.g., to navigate to another view of the GUI).

Figure 6:
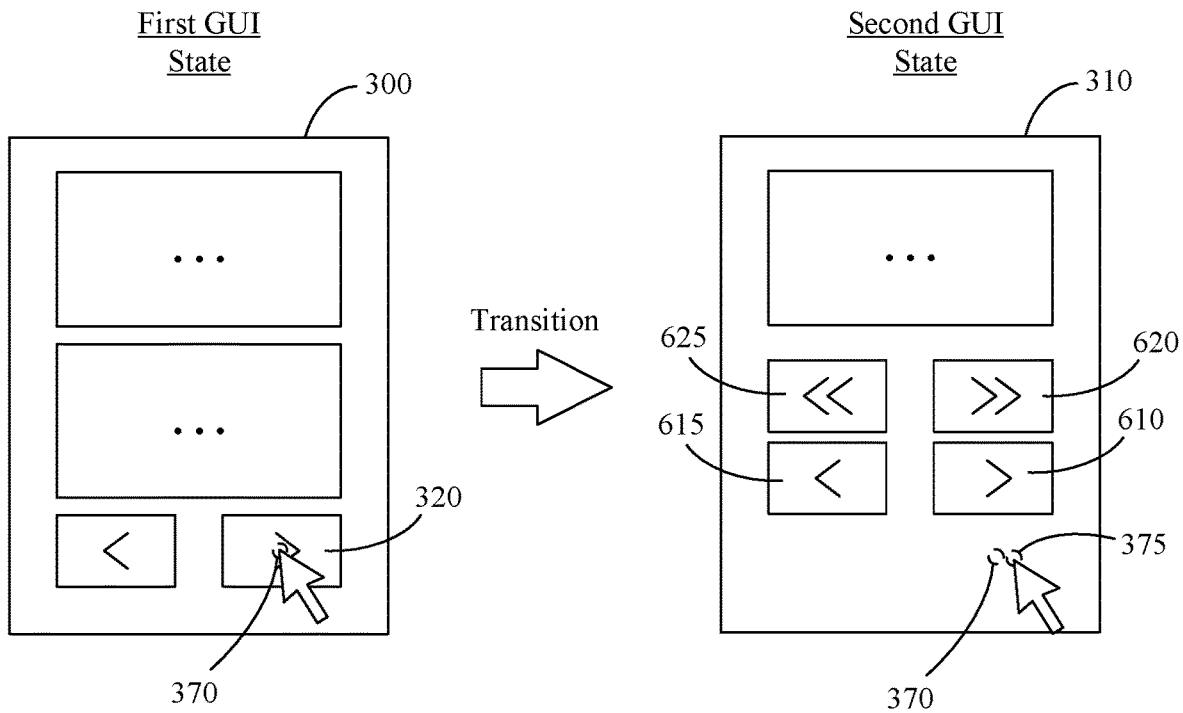
FIG. 6 is a pictorial diagram illustrating examples of views presented a graphical user interface.

Referring again to decision box 412, if the level of association does not exceed the threshold value, the process can continue to step 416 of FIG. 4B. At step 416, the data processing system 100 can identify one or more controls presented in the second state of the GUI that are located within a threshold distance of the first spatial location 370. In illustration, referring to FIG. 5, the controls 510, 515, 520 can be located within a threshold distance of the first spatial location 370, while the control 525 is not. Indeed, the control 510 can be located at the first spatial location 370. Thus, the data processing system 100 can identify the controls 510-520. In another example, FIG. 6 depicts the second state of the GUI in which controls 610, 615, 620 are located within a threshold distance of the first spatial location 370, while the control 625 is not, but none of the controls 610-625 are located at the first spatial location 370 nor the second spatial location 375. Thus, the data processing system 100 can identify the controls 610-620 of FIG. 6. For simplicity, the remaining steps described for the method 400 may refer to the controls 610-620, but it will be understood that the steps also can apply to the controls 510-520 of FIG. 5.

At step 418, the data processing system 100 can identify, in the second data pertaining to the second state of the GUI, contextual data for the controls 610-620 identified in the second state that are within the threshold distance of the first spatial location 370. At step 420, the data processing system can determine, for each of the identified controls presented in the second state that are within the threshold distance of the first spatial location 370, a level of association between the control 320 presented in the first state of the GUI and the respective control 610-620 presented in the second state of the GUI by comparing the first contextual data to the contextual data for the respective control 610-620, and determine whether the level of association exceeds the association threshold value or a second association threshold value. In illustration, the data processing system can compare contextual data of the control 320 to contextual data for each of the controls 610-620, and for each comparison, determine whether the level of association exceeds the association threshold value or the second association threshold value.

Referring to decision box 422, if, for each of the respective controls 610-620, the respective level of association with the control 320 does not exceed the association threshold value or the second association threshold value, at step 424 the data processing system 100 can send the second user input event to a user interface element located at the second spatial location selected by the second user input. For example, referring to FIG. 6, the second user input can select empty space within the window presented by the view 310, thus the second user input event can be sent to that window. Of course, if there is another user interface element (not shown in FIG. 6) located at the second spatial location 375, such as another control, the second user input event can be sent to that other user interface element. For example, referring to FIG. 5, the second user input event can be sent to the control 510.

Referring again to decision box 422, if there is at least one control 610-625 for which the respective level of association exceeds the association threshold value or the third threshold value, the process can continue to step 426 of FIG. 4C. At step 426, the data processing system 100 can present to the user at least one user interface element prompting the user to select a control 610-620 presented in the second state of the GUI to which to send the second user input event or to send another user input event. As will be described, the data processing system 100 can include functionality allowing the user to cancel the second user input event. Referring to decision box 428, if the user cancels the second user input event, at step 430 the data processing system 100 can cancel the second user input event, for example by not sending the second user input event to a control 610-625. If, however, the user selects to send the second user input event, or another user input event, to a selected control, at step 432 the data processing system 100 can send the user input event to the appropriate control 610-625.

Figure 7:
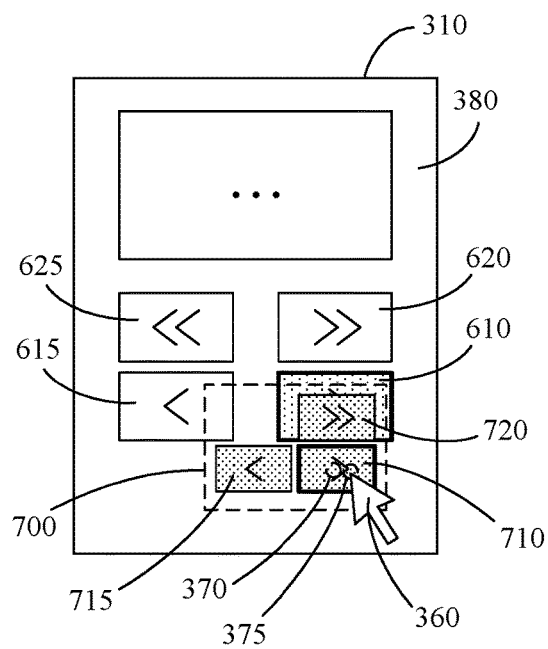
FIG. 7 is a pictorial diagram illustrating examples of views presented a graphical user interface.

In illustration, referring to FIG. 7, the data processing system can present a view 700 over the view 310, for example as a pop-up window. The view 700 can present controls 710, 715, 720 corresponding to, and representing, the controls 610, 615, 620, respectively. For example, the control 710 can be another instance of the control 610, the control 715 can be another instance of the control 615, and the control 720 can be another instance of the control 620, or functionality of the controls 710, 715, 720 can be linked to the controls 610, 615, 620. In one arrangement, the data processing system 100 can store, at least temporarily, the second user event in the memory elements 110 and, responsive to detecting a third user input event selecting a control 710-720, can send the second user event to the respective control 610-620 represented by the selected control 710-720. In another arrangement, responsive to detecting a third user input event selecting a control 710-720, the data processing system 100 can send that user input event to the respective control 610-620 represented by the selected control 710-720, in which case the second user input event need not be sent to a control 610-620. Thus, the user can select the control 710 in order to select the control 610, the user can select the control 715 in order to select the control 615, and the user can select the control 720 in order to select the control 620.

The user can enter a user input that causes the data processing system 100 to cancel presentation of the view 700, and thus close the view 700, at any time during presentation of the view 700, and thus the user need not select a control 710-720 from the view 700. The user can cancel presentation of the view by, for example, selecting an escape key ("Esc") from a keyboard, selecting an area of the user interface outside of the view 700, entering a right mouse click, selecting a cancel button (not shown) presented in the view 700, or providing any other user input defined to cancel presentation of the view 700. The data processing system 100 also can close the view 700 responsive to the user selecting a control 710-720, or responsive to the user directly selecting a control 610-625 or another user interface element presented in the view 310.

The controls 710-720 can present text, symbols, icons, etc. that are the same as those presented by the controls 610-620, respectively, but the controls 710-720 need not be presented at the same size as the controls 610-620. For example, the controls 710-720 can be presented with smaller or larger spatial dimensions. Further, referring to FIG. 6, assume that the control 320 is located at the first spatial location 370. Also assume that the level of association of the control 610 with the control 320, determined at step 420, is higher than the level of association of the controls 615, 620 with the control 320. In this case, the data processing system 100 can present the view 700 so as to present the control 710 at the first spatial location 370 (and/or at the second spatial location 375).

Responsive to the user hovering the cursor 360 or an appendage (e.g., finger) over the control 710, the data processing system 100 can apply a visual effect to the control 610 and, optionally, to the control 710. The visual effects can be selected to indicate to the user that the user is hovering over the control 710, and to indicate that selection of the control 710 is equivalent to selecting the control 610. The visual effects that are applied can include, but are not limited, highlighting, change in color, change in contrast, change in line widths, and so on.

Figure 8:
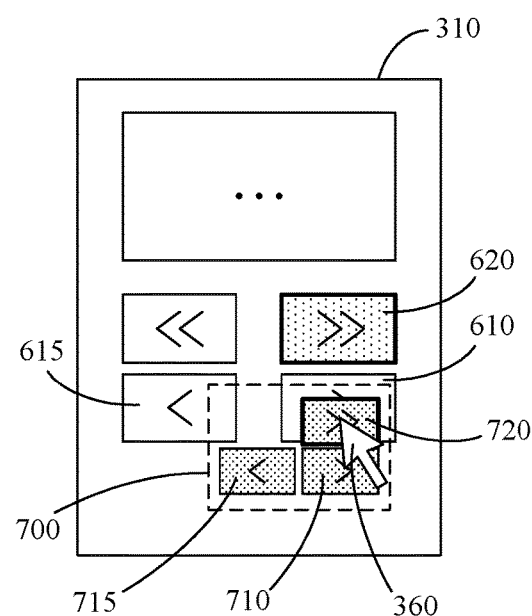
FIG. 8 is a pictorial diagram illustrating examples of views presented a graphical user interface.

Continuing with the previous example, reference is now made to FIG. 8, which presents the views 310, 700. Responsive to the user hovering the cursor 360 or an appendage over the control 720, the data processing system 100 can apply a visual effect to the control 620 and, optionally, to the control 720. The visual effects can be selected to indicate to the user that the user is hovering over the control 720, and to indicate that selection of the control 720 is equivalent to selecting the control 620. The visual effect(s) applied to the control 610 and the control 710 responsive to the user hovering the cursor 360 or an appendage over the control 710 can be removed from the controls 610, 710. The data processing system 100 can apply similar visual effects to the control 615 and, optionally, the control 715 responsive to the user hovering the cursor 360 or an appendage over the control 715.

Figure 9:
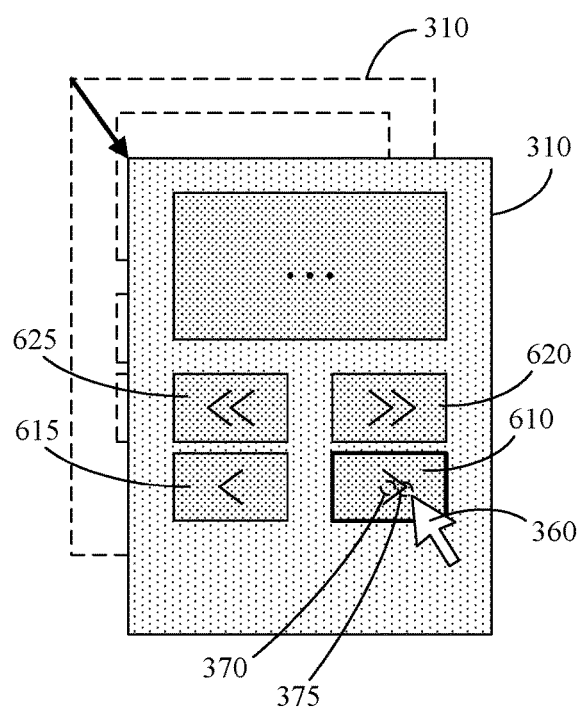
FIG. 9 is a pictorial diagram illustrating an example of moving a view presented a graphical user interface.

FIG. 9 presents another example of presenting to the user at least one user interface element prompting the user to select a control 610-620, presented in the second state of the GUI, to which to send the second user input event or a subsequent user input event. In this example, assume that the control 610 is determined by the data processing system 100 to have a level of association with the control 320 (shown in FIG. 6) that is higher than the respective levels of association of the controls 615, 620 with the control 320. The data processing system 100 can prompt the user to select the control 610 by moving the control 610 to the first spatial location 370 (and/or at the second spatial location 375). For example, the data processing system 100 can move only that control 610, or can move the view 310 so that the control 610 is presented in that view 310 at the first spatial location 370 (and/or at the second spatial location 375), as shown in FIG. 9. The data processing system 100 also can apply a visual effect to the control 610 to prompt the user to select that control 610. The user can select the control 610 by entering a third user input event at the first spatial location 370, or any other spatial location within a GUI region bounded by a perimeter the control 610, or choose to select another control 615, 620, 625. Responsive to the user selecting a control 610-625, the data processing system 100 can send to the control the second user input event to the selected control, or send to the selected control 610-625 the third user input event.

The user can enter a user input that causes the data processing system 100 to move the control 610/view 310 back to its original location in the GUI at any time during presentation of the view 700, and thus the user need not select a control 610, 615, 620, 625 from the view 310. The user can initiate the move of the control 610/view 310 back to the original location, for example, by selecting an escape key ("Esc") from a keyboard, selecting an area of the user interface outside of the view 310, entering a right mouse click, selecting a cancel button (not shown) presented in the view 310 or elsewhere, or providing any other user input defined to cancel presentation of the view 310 at the new location. In the case that selection of a control 610-625 does not initiate a transition from the view 310 to another view, the data processing system 100 also can move the control 610/view 310 back to its original location responsive to the user selecting a control 610-625.

Figure 10:
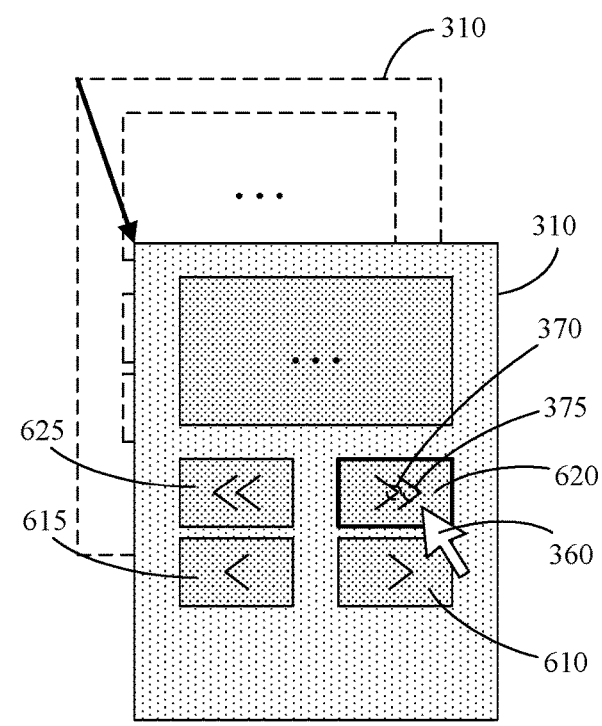
FIG. 10 is a pictorial diagram illustrating an example of moving a view presented a graphical user interface.

Continuing with the previous example, reference is now made to FIG. 10, which presents another example of presenting to the user at least one user interface element prompting the user to select a control 610-620, presented in the second state of the GUI, to which to send the second user input event or a subsequent user input event. In this example, the user can enter one or more user inputs to further move the view 310. In illustration, the user can use a mouse scroll wheel or tab, or select another control, to move the view 310 from the location indicated in FIG. 9. For example, if the user scrolls up, the data processing system 100 can move the view 310 so that the control 620 is located at the first spatial location 370 (or the second spatial location 375). Similarly, if the user scrolls left, the data processing system 100 can move the view 310 so that the control 615 is located at the first spatial location 370 (or the second spatial location 375).

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    generating a first user input event initiating a transition of a graphical user interface (GUI) from a first state to a second state in response to detecting a first user input received by the GUI, wherein the transition comprises a navigation transition from the first state to the second state in an application;
    storing first data pertaining to the first state of the GUI;
    storing second data pertaining to the second state of the GUI;
    identifying, in real time, a first spatial location in the GUI selected by the first user input;
    generating a second user input event in response to detecting a second user input received by the GUI while the GUI is in the second state;
    identifying, in real time, a second spatial location in the GUI selected by the second user input;
    determining, in real time, a level of discontinuity between the first user input and the second user input, and determining whether the level of discontinuity between the first user input and the second user input exceeds a discontinuity threshold value; and
    responsive to determining that the level of discontinuity between the first user input and the second user input does not exceed the discontinuity threshold value, selecting, using a processor, in real time, at least one user input event handling process based on the level of discontinuity not exceeding the discontinuity threshold value, and processing the second user input event, in real time, using the selected at least one user input event handling process;
    wherein the selected at least one user input event handling process comprises:
    identifying, in the first data pertaining to the first state of the GUI, a control presented in the first state of the GUI at the first spatial location and identifying first contextual data for the control presented in the first state of the GUI at the first spatial location;
    identifying, in the second data pertaining to the second state of the GUI, a control presented in the second state of the GUI at, or within a threshold distance of, the first spatial location, and identifying second contextual data for the control presented in the second state of the GUI at, or within the threshold distance of, the first spatial location;
    determining a level of association between the control presented in the first state of the GUI and the control presented in the second state of the GUI at, or within the threshold distance of, the first spatial location by comparing the first contextual data to the second contextual data, and determining whether the level of association exceeds an association threshold value; and
    responsive to determining that the level of association exceeds the association threshold value, sending the second user input event to the control presented in the second state of the GUI at, or within the threshold distance of, the first spatial location.

2. The method of claim 1, wherein determining, in real time, the level of discontinuity between the first user input and the second user input comprises:
    determining, in real time, a period of time between when the first user input event is received by the GUI and when the second user input is received by the GUI; and
    determining a spatial distance between the first spatial location and the second spatial location.

3. The method of claim 1, wherein the control presented in the second state of the GUI is not located at the first spatial location.

4. A system, comprising:
    a processor programmed to initiate executable operations comprising:
    generating a first user input event initiating a transition of a graphical user interface (GUI) from a first state to a second state in response to detecting a first user input received by the GUI, wherein the transition comprises a navigation transition from the first state to the second state in an application;
    storing first data pertaining to the first state of the GUI;
    storing second data pertaining to the second state of the GUI;
    identifying, in real time, a first spatial location in the GUI selected by the first user input;
    generating a second user input event in response to detecting a second user input received by the GUI while the GUI is in the second state;
    identifying, in real time, a second spatial location in the GUI selected by the second user input;
    determining, in real time, a level of discontinuity between the first user input and the second user input, and determining whether the level of discontinuity between the first user input and the second user input exceeds a discontinuity threshold value; and
    responsive to determining that the level of discontinuity between the first user input and the second user input does not exceed the discontinuity threshold value, selecting, in real time, at least one user input event handling process based on the level of discontinuity not exceeding the discontinuity threshold value, and processing the second user input event, in real time, using the selected at least one user input event handling process;

wherein the selected at least one user input event handling process comprises:

identifying, in the first data pertaining to the first state of the GUI, a control presented in the first state of the GUI at the first spatial location and identifying first contextual data for the control presented in the first state of the GUI at the first spatial location;

identifying, in the second data pertaining to the second state of the GUI, a control presented in the second state of the GUI at, or within a threshold distance of, the first spatial location, and identifying second contextual data for the control presented in the second state of the GUI at, or within the threshold distance of, the first spatial location;

determining a level of association between the control presented in the first state of the GUI and the control presented in the second state of the GUI at, or within the threshold distance of, the first spatial location by comparing the first contextual data to the second contextual data, and determining whether the level of association exceeds an association threshold value; and responsive to determining that the level of association exceeds the association threshold value, sending the second user input event to the control presented in the second state of the GUI at, or within the threshold distance of, the first spatial location.

5. The system of claim 4, wherein determining, in real time, the level of discontinuity between the first user input and the second user input comprises:

determining, in real time, a period of time between when the first user input event is received by the GUI and when the second user input is received by the GUI; and determining a spatial distance between the first spatial location and the second spatial location.

6. The system of claim 4, wherein the control presented in the second state of the GUI is not located at the first spatial location.

7. A computer program product, comprising:

a computer readable storage medium having program code stored thereon, the program code executable by a data processing system to initiate operations including:

generating a first user input event initiating a transition of a graphical user interface (GUI) from a first state to a second state in response to detecting a first user input received by the GUI, wherein the transition comprises a navigation transition from the first state to the second state in an application;

storing first data pertaining to the first state of the GUI;

storing second data pertaining to the second state of the GUI;

identifying, in real time, a first spatial location in the GUI selected by the first user input;

generating a second user input event in response to detecting a second user input received by the GUI while the GUI is in the second state;

identifying, in real time, a second spatial location in the GUI selected by the second user input;

determining, in real time, a level of discontinuity between the first user input and the second user input, and determining whether the level of discontinuity between the first user input and the second user input exceeds a discontinuity threshold value; and responsive to determining that the level of discontinuity between the first user input and the second user input does not exceed the discontinuity threshold value, selecting, in real time, at least one user input event handling process based on the level of discontinuity not exceeding the discontinuity threshold value, and processing the second user input event, in real time, using the selected at least one user input event handling process;

wherein the selected at least one user input event handling process comprises:

identifying, in the first data pertaining to the first state of the GUI, a control presented in the first state of the GUI at the first spatial location and identifying first contextual data for the control presented in the first state of the GUI at the first spatial location;

identifying, in the second data pertaining to the second state of the GUI, a control presented in the second state of the GUI at, or within a threshold distance of, the first spatial location, and identifying second contextual data for the control presented in the second state of the GUI at, or within the threshold distance of, the first spatial location;

determining a level of association between the control presented in the first state of the GUI and the control presented in the second state of the GUI at, or within the threshold distance of, the first spatial location by comparing the first contextual data to the second contextual data, and determining whether the level of association exceeds an association threshold value; and responsive to determining that the level of association exceeds the association threshold value, sending the second user input event to the control presented in the second state of the GUI at, or within the threshold distance of, the first spatial location.

8. The computer program product of claim 7, wherein determining, in real time, the level of discontinuity between the first user input and the second user input comprises:

determining, in real time, a period of time between when the first user input event is received by the GUI and when the second user input is received by the GUI; and determining a spatial distance between the first spatial location and the second spatial location.

9. The computer program product of claim 7, wherein the control presented in the second state of the GUI is not located at the first spatial location.

* * * * *